(12) United States Patent
Behruzi et al.

(10) Patent No.: US 10,393,317 B2
(45) Date of Patent: Aug. 27, 2019

(54) OBVIATING LIQUID INTRUSION INTO A GAS SUPPLY LINE

(71) Applicant: ArianeGroup GmbH, Bremen (DE)

(72) Inventors: Kei Philipp Behruzi, Bremen (DE); Joerg Klatte, Bremen (DE)

(73) Assignee: ArianeGroup GmbH, Bremen (DE)

( * ) Notice: Subject to any disclaimer, the term of this patent is extended or adjusted under 35 U.S.C. 154(b) by 56 days.

(21) Appl. No.: 15/668,904

(22) Filed: Aug. 4, 2017

(65) Prior Publication Data

US 2018/0073681 A1    Mar. 15, 2018

(30) Foreign Application Priority Data

Sep. 14, 2016 (EP) ..................... 16188817
Dec. 2, 2016 (EP) ..................... 16202028

(51) Int. Cl.
    *F17C 13/00*    (2006.01)
    *B64G 1/40*     (2006.01)

(52) U.S. Cl.
    CPC ............ *F17C 13/008* (2013.01); *B64G 1/402* (2013.01); *F17C 2221/014* (2013.01); *F17C 2221/017* (2013.01); *F17C 2270/0194* (2013.01)

(58) Field of Classification Search
    CPC ................ F17C 13/008; F17C 13/088; F17C 2270/0194; F17C 2221/017; F17C 2221/014; B64G 1/402
    See application file for complete search history.

(56) References Cited

U.S. PATENT DOCUMENTS

| | | | |
|---|---|---|---|
| 4,027,494 A | 6/1977 | Fletcher et al. | |
| 4,435,196 A | 3/1984 | Pielkenrood | |
| 4,617,031 A | 10/1986 | Suh et al. | |
| 4,743,278 A * | 5/1988 | Yeh ..................... | B64G 1/402 137/154 |
| 4,848,987 A | 7/1989 | Howard et al. | |
| 5,901,557 A * | 5/1999 | Grayson ................ | F17C 1/00 62/45.1 |
| 7,077,885 B2 | 7/2006 | Charlat | |
| 8,048,211 B2 * | 11/2011 | Behruzi ................ | F17C 13/088 220/745 |
| 2008/0237099 A1 | 10/2008 | Behruzi | |
| 2009/0293729 A1 | 12/2009 | Behruzi | |
| 2014/0283936 A1 | 9/2014 | Dandaleix | |

FOREIGN PATENT DOCUMENTS

| | | |
|---|---|---|
| DE | 102008026320 | 12/2009 |
| EP | 1953445 | 8/2008 |

OTHER PUBLICATIONS

European Search Report, dated Jun. 23, 2017, priority document.

* cited by examiner

*Primary Examiner* — Ian G Paquette

(74) *Attorney, Agent, or Firm* — Greer, Burns & Crain, Ltd.

(57) ABSTRACT

A gas injection device for injecting an expulsion gas into a tank for a liquid. The gas injection device comprises an inlet pipe for receiving the gas and a distributor portion for releasing the gas through a plurality of capillary passages. The inlet pipe has a first end configured to be connected to a gas supply line and a second end located within a chamber in the distributor portion. The capillary passages respectively extend in a direction adapted to a periphery of the chamber. A tank for a liquid is provided, the tank comprising a gas injection device. A spacecraft is provided comprising such a tank.

12 Claims, 4 Drawing Sheets

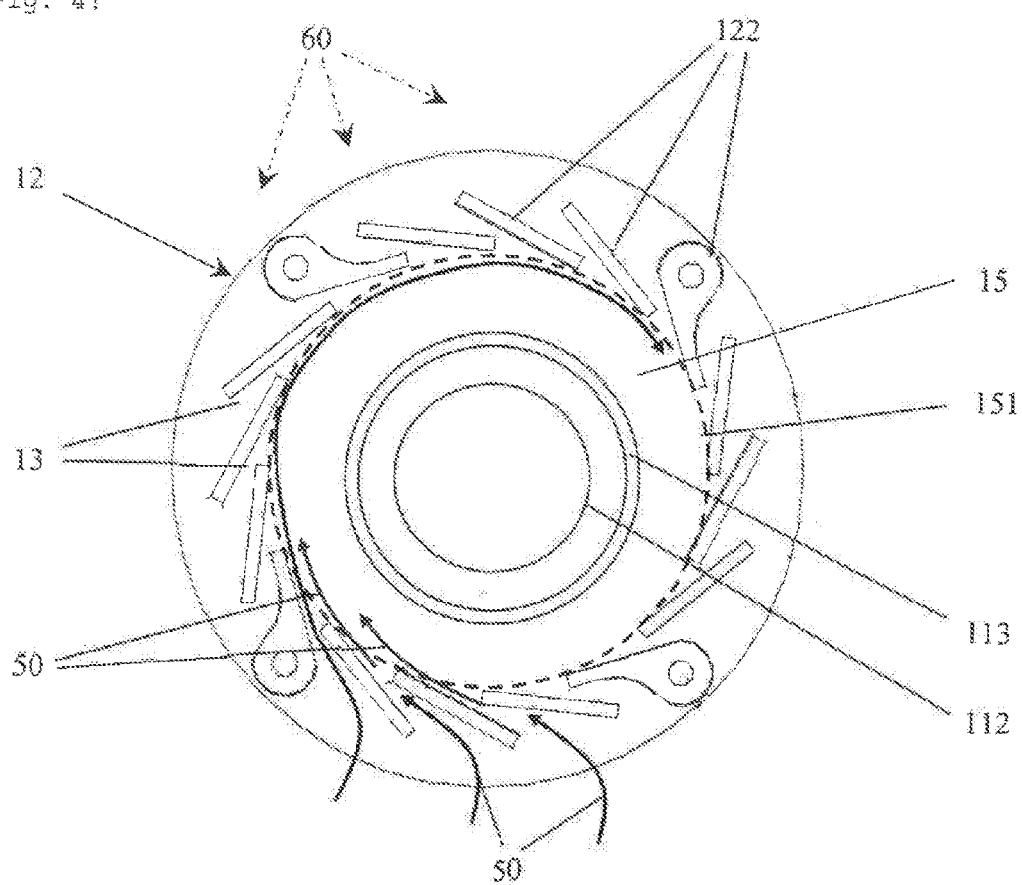

OBVIATING LIQUID INTRUSION INTO A GAS SUPPLY LINE

CROSS-REFERENCES TO RELATED APPLICATIONS

This application claims the benefit of the European patent application No. 16188817.7 filed on Sep. 14, 2016 and of the European patent application No. 16202028.3 filed on Dec. 2, 2016, the entire disclosures of which are incorporated herein by way of reference.

BACKGROUND OF THE INVENTION

The present invention concerns a gas injection device for injecting an expulsion gas into a tank for a liquid. The invention further concerns a tank for a cryogenic or storable fuel and a spacecraft comprising a tank.

At low or even zero gravity, liquids such as cryogenic fuels or storable fuels (i.e., fuels being storable for several years at room temperature) of a spacecraft and/or oxidators may be extracted from a tank by supplying pressurized inert gas such as helium or nitrogen into the tank, which then expulses the respective liquid. To maintain the functionality of the upstream equipment (e.g., of valves) of the gas supply line, a counter current of the liquid into the line, which may occur when the gas injection is interrupted, is to be obviated. Such counter current may, in particular, result from an acceleration of the tank carrying apparatus, which may be a spacecraft, for instance.

Different apparatus for separating a gas and a liquid are known. For instance, document U.S. Pat. No. 4,027,494 A discloses a phase separator involving superconducting magnets. From U.S. Pat. No. 4,848,987 A, a phase separator deploying pumps and valves is known. Document U.S. Pat. No. 7,077,885 B2 discloses a phase separator including a propeller and a membrane.

Due to the respective specific components, these devices are often fragile and laborious in the production.

Moreover, separator devices known from documents U.S. Pat. Nos. 4,435,196 A and 4,617,031 A are limited to operation under gravity conditions.

Document DE 10 2008 026 320 discloses a device preventing intrusion of a liquid into a gas line, wherein a separation of gas and liquid is achieved by means of meshes including a gas bubble. However, the device being applicable not only when a gas supply into the tank is stopped, but also when gas is discharged from the tank, is rather complex and, therefore, costly in production.

SUMMARY OF THE INVENTION

It is, therefore, an object of the present invention to provide a robust and plain technique for protecting a gas supply line against intrusion of a liquid. It is a further object of the present invention to provide a tank for a liquid ensuring a gas supply line protection, and a spacecraft having a protected gas supply line.

A gas injection device according to the present invention is to inject an expulsion gas into a tank for a liquid. The injection device comprises an inlet pipe for receiving the gas and a distributor portion for releasing the gas through a plurality of capillary passages (provided in the distributor portion). The inlet pipe has a first end configured to be connected to a gas supply line (e.g., by means of a connector element of a tank), and a second end located within a chamber formed by the distributor portion. The capillary passages respectively extend from the chamber in a direction adapted to a periphery of the chamber.

Accordingly, the capillary passages are arranged so as to allow for a main flow (of gas or liquid) running, through the capillary passages, along a curve basically or generally tangent to the periphery of the chamber; the curve may be straight or crooked. Thus, in a situation where a liquid flows through such capillary passage from the environment of the distributor portion into the chamber, the liquid is guided, by the capillary passage, so as to enter the chamber flowing along the boundary thereof.

Preferably, the periphery of the chamber is basically or generally circular. The capillary passages (or the main flow they allow for) may be crooked or essentially straight.

Due to the capillary action of a liquid and the direction of the capillary passages being adapted to the periphery of the chamber (i.e., to the boundary thereof), when a gas injection through the inlet pipe is stopped and a liquid enters the distributor portion from the environment thereof through the capillary passages into the chamber, the liquid is forced into a rotational movement. Thereby, the liquid encloses a gas bubble at the second end of the inlet pipe, and the gas bubble is inhibited from escaping from the chamber. Reversely, the gas bubble thus blocks the inlet pipe, so that the liquid cannot enter the gas supply line. The chamber thus provides a compensation volume in which the size of the gas bubble may vary, rendering tolerable pressure variations which may occur within the gas supply system.

In this way, the gas injection device according to the present invention provides for a reliable protection of a supply line, and due to its clear structure, it is both robust and producible without effort.

Preferably, the capillary passages provide the only openings of the chamber towards the environment of the gas injection device within the tank.

According to an advantageous embodiment of the present invention, at least one of the capillary passages includes at least a section which widens towards an environment of the distributor portion, thus, in which the cross-sectional area of the capillary passages increases outwards, respectively. Stated differently, within the section, one or more of the capillary passages may narrow towards the chamber. Such shape provides for an advantageous distribution of the gas when it is injected into the tank. Moreover, the shape increases the capillary effect the capillary passages exert on a liquid entering them in the opposite direction, from the tank into the chamber of the gas injection device, when the injection of gas is stopped. Thereby, the rotational movement is boosted and, therewith, the protection process is improved.

The chamber may be basically or generally shaped rotationally symmetric with respect to an axis; in particular, the periphery of the chamber may extend along the circumferential surface of a circular cylinder. Preferably, at least a portion (especially a portion comprising the second end) of the inlet pipe is arranged basically or generally coaxial with the chamber.

The distributor portion may preferably include a (preferably circular) base plate, a cover plate through which the inlet pipe passes and a side structure being a structure connecting the base plate and the cover plate. Thereby, the chamber may be determined. Preferably, the base plate and the cover plate face each other. In particular, the base plate and/or the cover plate may have a basically or generally circular circumference, and/or may be plane, domed or corrugated.

The cover plate and/or the base plate may comprise a respective frame region surrounding the blades, thus providing an overhang over the blades. Such frame region(s) may provide for an advantageous direction of liquid intruding into the distributor portion when the gas injection has been stopped, namely a direction basically or generally parallel to the cover plate and/or the base plate, respectively, thus improving the rotational movement within the chamber.

Preferably, a gap between the boundary of the chamber and the gas bubble has a width w in the order of the capillary radius r, which is specified by the boundary surface (i.e., by the meniscus) of the liquid and the gas. For example, in a case of a globular gas bubble, the capillary radius is the radius of the gas bubble. The capillary radius depends on the surface tension and the length scale of the geometry. The stability of the meniscus depends on the width of the gap in a monotonically decreasing way. That is, when the gap is narrower (i.e., when the width is smaller), the meniscus is more stable with respect to external disturbances (which may be caused by an increase in speed). The emerging width w is based on the stability of the liquid-gas interface which is driven by the acceleration thrust level in orbit. Moreover, the smaller the gas bubble, the larger is the capillary pressure. For instance, the width w may be in an interval from 0.5 r to 1.5 r (so that 0.5 r≤w≤1.5 r), preferably from 0.75 r to 1.25 r (so that 0.75 r≤w≤1.25 r) or even from 0.9 r to 1.1 r (so that 0.9 r≤w≤1.1 r). Such relations advantageously prevent the escape of gas and the intrusion of liquid into the pipe.

The side structure may comprise a plurality of capillary tubes forming the capillary passages. The capillary tubes may be basically or generally tangent to the periphery of the chamber (i.e., they may respectively share a same tangent line with the periphery). Additionally or alternatively, the side structure may include a plurality of blades extending from the base plate to the cover plate. The plurality of blades may be shifted in position from one to another, thereby surrounding the chamber in a fan-like manner. Preferably, some or all of the blades extend in a direction orthogonal to the base plate and/or to the cover.

According to a preferred embodiment, some or all of the blades may extend basically or generally tangentially to the periphery of the chamber. In particular, the blades may have respective edges arranged along a circumferential surface of a circular cylinder which may form the periphery of the chamber, and the blades may extend along respective tangent planes of the circumferential surface.

Gaps between neighboring blades may form the capillary passages. Such structure of the device is particularly stable and simple in production.

The plurality of blades may include a subset of blades that are fixed (e.g., cast or welded) to the base plate, these blades further referred to herein as base blades. Some or all of such base blades may be configured as fastening blades, by comprising fastening means (e.g., a flange, a bore or the like) for fastening the respective base blade to the cover plate, possibly by means of a further fastening means (such as a clamp or a bolt), so as to build the distributor portion. Additionally or alternatively, the plurality of blades may include a subset of blades that are fixed (e.g., cast or welded) to the cover plate, these blades further referred to herein as cover blades. Some or all of such cover blades may be configured as fastening blades, by comprising fastening means (e.g., a flange, a bore or the like) for fastening the respective cover blade to the base plate, possibly by means of a further fastening means (such as a clamp or a bolt), so as to build the distributor portion. According to a particular embodiment, the plurality of blades includes both base blades and cover blades, which may be arranged alternating in the distributor portion.

Such embodiments provide a robust distributor portion and a simple construction thereof. In particular, by arranging base blades and cover blades alternately, narrow capillary passages can be formed, whereas due to the greater distance of the base blades to one another, they can be easily fixed to the base plate, and analogously, the cover blades can be easily fixed to the cover plate.

According to another advantageous embodiment, the distributor portion or even the entire gas injection device may be monolithic, formed e.g., in an additive manufacturing process.

Preferably, the inlet pipe comprises a cylinder-like portion in which the inlet pipe is basically or generally shaped as a circular cylinder. In particular, the first end of the inlet pipe may be an end of such cylinder-like portion.

According to a preferred embodiment, the inlet pipe comprises a narrowing portion in which the inlet pipe narrows towards the second end. For instance, the narrowing portion may be shaped basically or generally conically or along an arched surface of revolution narrowing towards the second end. In particular, the portion may be shaped essentially as a truncated cone or as a truncated ellipsoid or a truncated hyperboloid. Such shapes support that, even in phases of small increase in speed (which phases are common in orbit mode), a gas bubble may be kept at the second end by the capillary pressure of entering liquid when the gas supply has been stopped (possibly temporarily). Moreover, the shape may minimize the pressure loss in phases when gas supply into the tank is restarted and the capillary passages are being blown free from liquid. The pressure loss may be driven by a high number of capillary passages (e.g., 12 or more) which may add up to a large cross sectional area. Preferably, the narrowing portion at least partially extends into the interior of the chamber in the distributor portion.

The second end may preferably be placed in a central region of the chamber. For instance, the (perpendicular) distance of the second end to a base plate of the distributor portion may be in an interval extending from one third to two thirds of the whole distance of the base plate to a cover plate of the distributor portion, especially at essentially half distance between the base plate and the cover. As a consequence, a gas bubble formed by rotating liquid as mentioned above can form a bulge, which provides a stable cushion prohibiting intrusion of the liquid into the inlet pipe.

According to an advantageous embodiment, the second end of the pipe is formed as a plain (preferably smooth) circumferential edge. That is, preferably no spikes or other irregularities are provided at the end edge of the inlet pipe. Such structure improves the stability of a gas bubble formed due to the rotational movement of entering liquid when the gas injection has been stopped. Preferably, the wall of the inlet pipe may be radially tapered at the second end of the inlet pipe, so that a sharp edge is formed at the second end. Such shape improves the second end holding the gas bubble in the situation mentioned.

A tank according to the present invention is configured to contain and provide a liquid, such as a cryogenic fuel (for example, liquid hydrogen and/or liquid oxygen) or a storable fuel (e.g., monomethyl hydrazine and/or hydrazine). The tank (which is preferably configured to be used in space, in particular in zero gravity condition) comprises a gas injection device according to an embodiment of the present invention as disclosed in this document. The first end of the inlet pipe is connected (directly or with one or more further components in between) to a connector element of the tank, the connector element being configured to be joined to a gas supply line.

For instance, the connector element may be formed by an intake tube extending into a tank volume, and the first end may be imposed onto or inserted into the intake tube. Such intake tube may be fixed to a wall of the tank or it may be formed monolithically with the tank wall. Preferably, a gap between the intake tube and the inlet pipe has a width (in a radial direction) of at most 0.2 mm. The inlet pipe and the intake tube each may comprise respective flanges which may be detachable or permanently connected to each other, e.g., by one or more bolts or by welding.

Preferably, the distributor portion of the gas injection device is located within the tank volume.

A spacecraft according to the present invention comprises a tank according to an embodiment of the present invention, and a gas supply line connected to the tank.

BRIEF DESCRIPTION OF THE DRAWINGS

In the following, preferred embodiments of the present invention are explained in more detail with respect to the drawings. As is to be understood, single elements and components may be combined alternatively to the manner shown. Reference signs for respective elements are used throughout various figures, and a repeated description of the related features is omitted. Moreover, to increase clarity of the figures, when a plurality multiple elements of a same type is shown, only a selection thereof is provided with reference signs.

FIG. 4 shows a functioning scheme of a gas injection device according to the present invention.

DETAILED DESCRIPTION OF THE PREFERRED EMBODIMENTS

Figure 1:
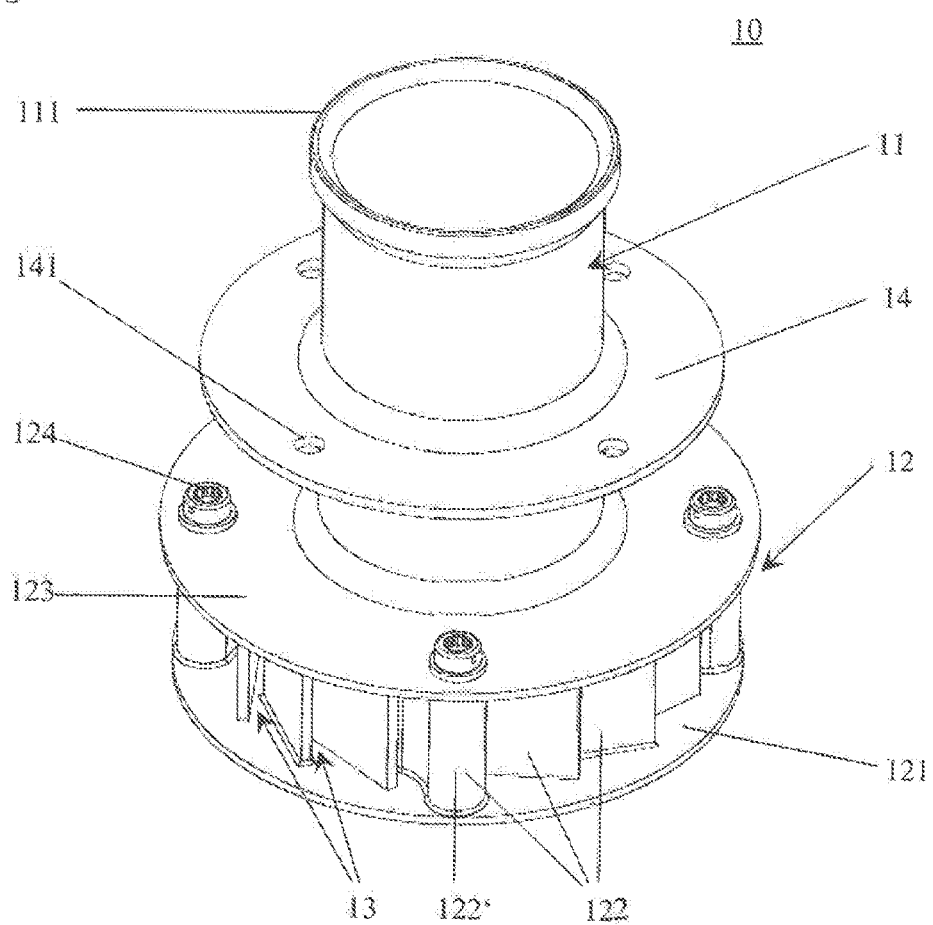
FIG. 1 shows an exemplary gas injection device according to the present invention.
Figure 3:
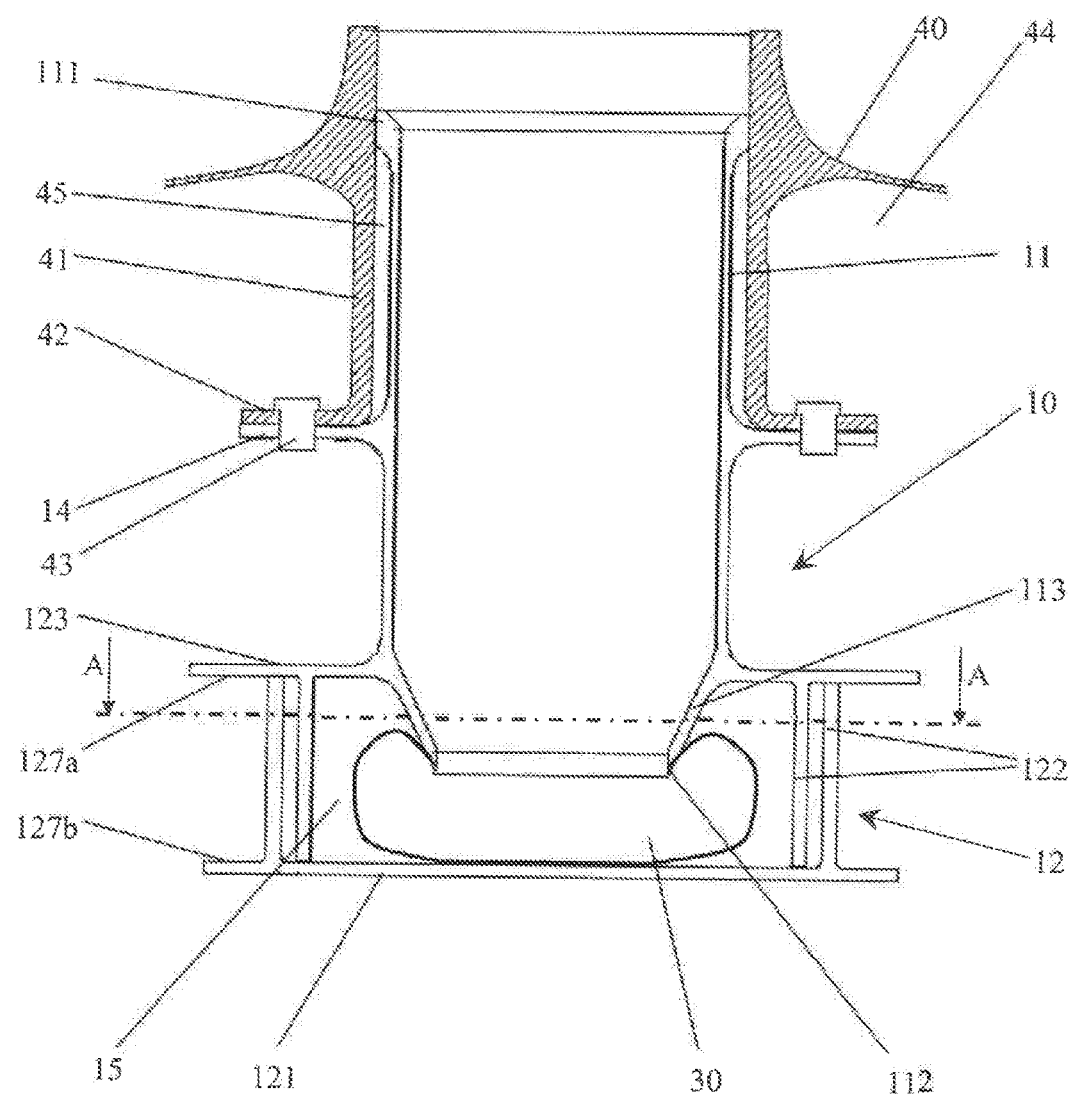
FIG. 3 shows a portion of an exemplary tank according to the present invention in a cross section.

FIG. 1 provides a perspective illustration of a gas injection device 10 according to an exemplary embodiment of the present invention. The gas injection device 1 comprises an inlet pipe 11 having a first end 111 to be connected to a gas supply line. For instance, the first end may be configured to be inserted into an intake tube of a tank, as shown in FIG. 3 and described below with reference thereto, or it may be configured to be imposed onto an intake tube of a tank.

The exemplary gas injection device 10 shown in FIG. 1 comprises a flange 14 surrounding the inlet pipe 11. The flange may preferably be configured to be fixed to a connector element of a tank. Such connector element, which may be formed monolithically with at least a portion of a wall of the tank or which may be connected to the wall of the tank, may likewise comprise a respective flange. In particular, the connector element may include an intake tube of a tank as mentioned above.

Holes 141 in the flange 14 of the gas injection device 10 may serve in combination with respective bolts (not shown) to fix the gas injection device 10 to the (not shown) connector element of the tank.

The second end 112 of the inlet pipe 11 is formed as a plain circumferential edge and is arranged in a chamber 15 formed within a distributor portion 12 of the gas injection device 10. Due to the perspective, neither the second end nor the chamber 15 is visible in FIG. 1; they are, however, indicated in FIGS. 2a, 2b and 3. The distributor portion 12 builds a plurality of capillary passages 13 which are configured to release an expulsion gas injected into the inlet pipe 11 and guided therewith into the chamber. The capillary passages extend in a direction adapted to a periphery of the chamber 15, and they narrow from the periphery of the distributor portion 12 towards the chamber in the interior of the distributor portion 12.

In the exemplary embodiment shown in FIG. 1, the capillary passages are essentially straight, extending basically or generally tangential to the periphery of the chamber. They are formed by a plurality of blades 122 arranged in a fan-like manner between a base plate 121 and a cover plate 123, the blades 122 extending orthogonally to both the base plate 121 and the cover plate 123 and basically or generally tangential to the chamber included therein. In the example shown, the blades 122 include at least a plane portion.

Figure 2A:
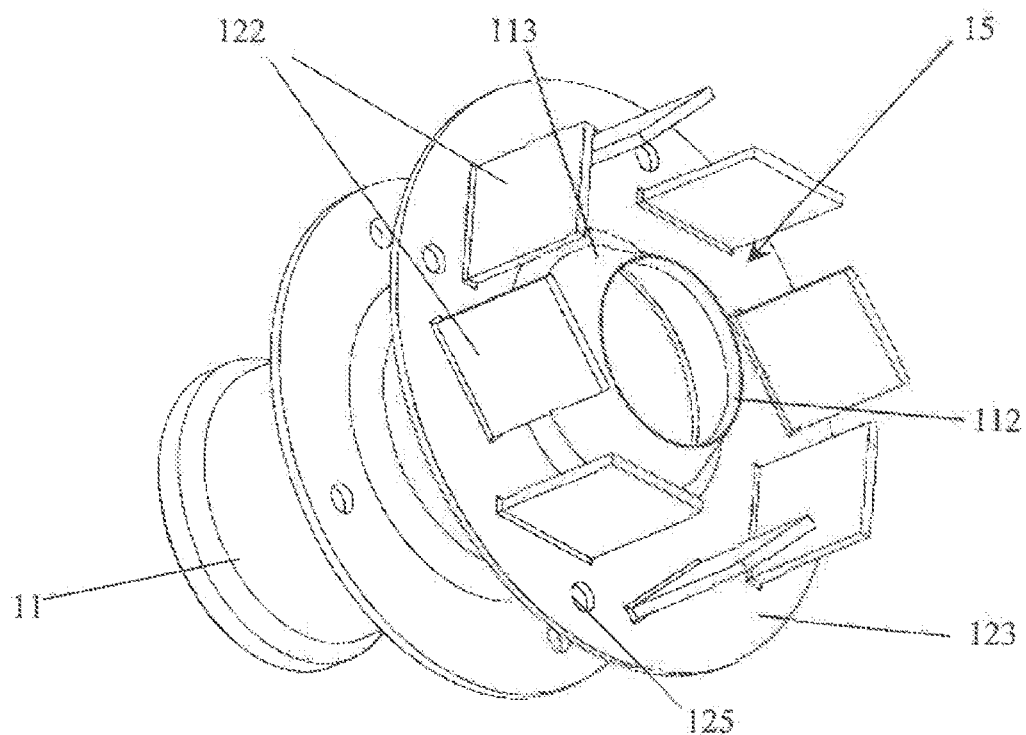
FIG. 2a shows a first main component of the embodiment of a gas injection device according to the present invention.
Figure 2B:
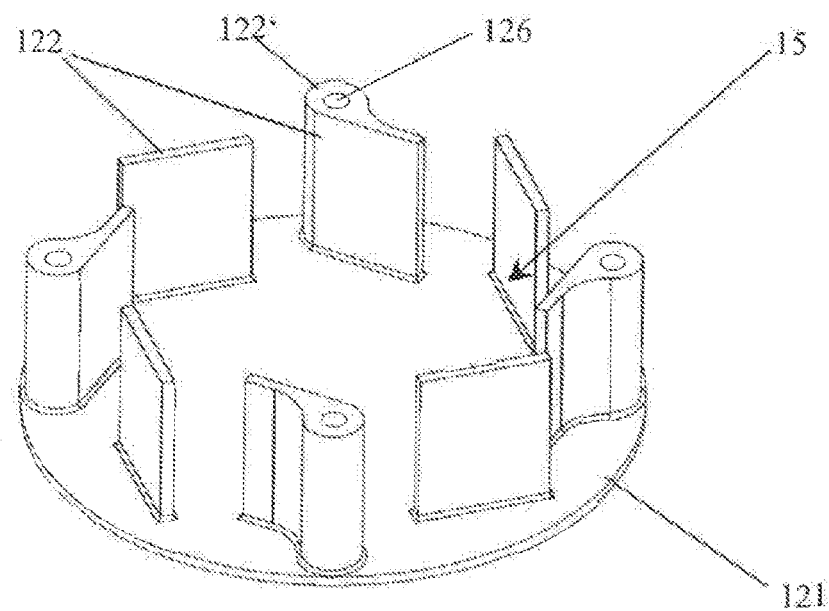
FIG. 2b shows a second main component of an embodiment of a gas injection device according to the present invention.

In the depicted case, the plurality of blades 122 includes fastening blades 122'; these fastening blades are fixed (e.g., welded) to the base plate 121, and they each include a bore (shown in FIG. 2b). Bolts 124 are inserted through respective boreholes in the cover plate 123 and into the bores. Thereby, the cover plate 123 is fastened to the fastening blades 122' and, therewith, to the base plate 121, thus building the distributor portion 12.

As mentioned above, alternatively, the distributor portion or even the entire gas injection device may be monolithic, possibly formed by means of an additive manufacturing process.

FIGS. 2a and 2b show the main components of the exemplary gas injection device 10 of FIG. 1 before the base plate 121 was mounted to the cover plate 123, with the blades 122 in between. FIGS. 2a and 2b thus provide an insight into the distributor portion 12 with the chamber 15.

As can be seen in FIGS. 2a and 2b, one half of the plurality of blades 122 are cover blades fixed to the cover plate 123 (see FIG. 2a) and the other half of the blades 122 are base blades fixed to the base plate 121 (see FIG. 2b). When the base plate and the cover plate are connected with the blades in between, the base blades and the cover blades are arranged alternately. Gaps between adjacent blades build the capillary passages 13 indicated in FIG. 1. Moreover, by the base plate 121, the cover plate 123 and the fan-like arranged blades 122, the chamber 15 is formed in the interior of the distributor portion 12. The blades 122 extend basically or generally tangentially to the periphery of the chamber 15, and accordingly, so do the capillary passages, which further narrow from the periphery towards the chamber.

In the example illustrated, some of the base blades shown in FIG. 2b are configured as fastening blades 122' including a bore 126. Accordingly, by means of bolts 124 (depicted in FIG. 1) which may be inserted through holes 125 provided in the cover plate 123, the base plate 121 with the base blades 122 fixed thereto may be connected to the cover plate 123 shown in FIG. 2a.

As shown in FIG. 2a, the inlet pipe 11 passes through the cover plate 123, so that the second end 112 of the inlet pipe is arranged in a central region of the chamber 15, at about half distance between the base plate and the cover. The inlet pipe includes a narrowing portion 113 which is shaped basically or generally conically. The chamber 15 is basically or generally shaped cylinder-like, wherein in the exemplary embodiment depicted, the chamber is coaxial with the inlet pipe 11.

The arrangement thus provides that an advantageous gas bubble can be formed by rotating liquid when the gas injection is stopped or paused, as mentioned above.

A gas bubble 30 thus formed is shown in FIG. 3, in which a portion of an exemplary tank 1 according to the present invention is depicted in a cross section. The tank has a tank wall 40 and a connector element 41, which is formed (monolithically with the tank wall 40) as an intake tube extending into a tank volume 44. The intake tube 41 is configured to be joined to a gas supply line (not shown).

In the exemplary tank shown in FIG. 3, the first end 111 of the inlet pipe 11 of a gas injection device 10 according to an embodiment of the present invention is inserted into the intake tube. The first end 111 is flared so that it touches the inner surface of the intake tube, while a gap 45 is formed between the intake tube and the inlet pipe's outer surface (beneath the first end). Preferably, the gap 45 has a width (in a radial direction of the inlet pipe) of at most 0.2 mm.

The inlet pipe 11 and the intake tube 41 each form a flange 14 and 42, respectively, which are arranged in a (preferably sealed) surface contact to each other and which are fastened to each other by bolts 43. Thereby, a solid fixing of the inlet pipe 11 to the wall 40 of the tank is achieved. According to an alternative embodiment (not shown), the inlet pipe and the gas supply line (or the inlet pipe and a connector element such as an intake tube of the tank) are directly welded together.

The inlet pipe 11 comprises a narrowing portion 113 which extends into the interior of the chamber 15 and which is shaped basically or generally as a truncated cone. The lip of the narrowing portion 113, i.e., the second end 112 of the inlet pipe 11, is radially tapered, so that a sharp circumferential edge is formed, which improves the ability of the second end to retain the gas bubble.

The distributor portion 12 comprises base plate 121, a cover plate 123 through which the inlet pipe 11 passes and a side structure formed by a plurality of blades 122. As indicated in FIG. 3, both the cover plate 123 and the base plate 121 comprise a frame region 127a, 127b, respectively, which surround the blades, thus providing an overhang over the blades. In the exemplary embodiment depicted in FIG. 3, the frame region 127a of the cover plate 123 has a larger width than the frame region 127b of the base plate 121.

In the situation depicted in FIG. 3, the injection of gas has been stopped. As a consequence, due to the arrangement according to the present invention utilizing the capillary action, the liquid (not shown) in the tank has entered the chamber 15 in a rotational movement, thus enclosing a gas bubble 30 which then blocks the inlet pipe 11. Therefore, the liquid cannot intrude into the inlet pipe 11 and into the supply line connected to the inlet pipe. Thus, the supply line is protected against harm.

The formation of the gas bubble 30 is represented in FIG. 4, which shows the distributor portion 12 of the gas injection device 10 in a section of FIG. 3 along the line A-A.

The plurality of blades 122 surrounds the chamber 15 which is essentially shaped as a cylinder. The blades are arranged in a fan-like manner around the chamber, thus forming the periphery 151 thereof (adumbrated with dotted lines), to which they each extend basically or generally tangential. Between each two adjacent blades 122, an interspace building a respective capillary passage 13 is left, the capillary passages thus likewise extending basically or generally tangential to the periphery 151. The width (measured in the plane of FIG. 4, thus orthogonally to the cylinder axis of the chamber 15) of the capillary passages increases outwards, i.e., from the chamber 15 towards the periphery of the distributor portion 12; at each point of a blade delimiting a capillary passage, the width may be determined by the shortest distance to the adjacent blade delimiting the same capillary passage.

Accordingly, the capillary passages narrow towards the chamber 15. Thereby, the capillary effect to a liquid 50 (for instance, a fuel 50) intruding into the capillary passages from the environment of distributor portion is intensified. As a consequence, the liquid 50 is absorbed by the capillary passages and forced into a rotational movement, as indicated in FIG. 4 by arrows. Thereby, a gas bubble can be encircled and retained at the second end 112 of the inlet pipe 11, as shown in FIG. 3. As the gas bubble inhibits the liquid intruding into the inlet pipe, the supply line connected thereto is protected against negative impairs of the liquid.

Disclosed is a gas injection device 10 for injecting an expulsion gas into a tank for a liquid. The gas injection device comprises an inlet pipe 11 for receiving the gas and a distributor portion 12 for releasing the gas through a plurality of capillary passages 13. The inlet pipe has a first end 111 configured to be connected to a gas supply line and a second end 112 located within a chamber 15 in the distributor portion. The capillary passages 13 respectively extend in a direction adapted to a periphery 151 of the chamber 15.

Further disclosed are a tank for a liquid, the tank comprising a gas injection device 10, and a spacecraft comprising a tank.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS 1 tank
10 gas injection device
11 inlet pipe
12 distributor portion
13 capillary passage
14 flange
15 chamber
20 connector element
30 gas bubble
40 tank wall
41 connector element
42 flange
43 bolt
44 tank volume
50 liquid
60 environment of the distributor portion
111 first end of inlet pipe 112 second end of inlet pipe
113 narrowing portion of inlet pipe
121 base plate of distributor portion
122 blade
122' fastening blade
123 cover plate of distributor portion
124 bolt
125 hole in ring shape cover
126 bore in fastening blade
127a, 127b frame region
141 hole in flange
151 periphery of chamber

The invention claimed is:

1. A gas injection device for injecting an expulsion gas into a tank for a liquid, the gas injection device comprising:
   an inlet pipe for receiving the gas, and
   a distributor portion for releasing the gas through a plurality of capillary passages,
   wherein the inlet pipe has a first end configured to be connected to a gas supply line and a second end located within a chamber in the distributor portion, and
   wherein the capillary passages respectively extend in a direction adapted to a periphery of the chamber, so as to allow for a main flow running, through the capillary passages, along a curve basically tangent to the periphery of the chamber.

2. The gas injection device according to claim 1, wherein the capillary passages include at least a section which widens towards an environment of the distributor portion.

3. The gas injection device according to claim 1, wherein the inlet pipe comprises a portion narrowing towards the second end of the inlet pipe.

4. The gas injection device according to claim 1, wherein the second end of the inlet pipe is placed in a central region of the chamber.

5. The gas injection device according to claim 1, wherein the second end is formed as at least one of a plain or sharp circumferential edge of the inlet pipe.

6. The gas injection device according to claim 1, wherein the distributor portion includes a base plate, a cover plate the inlet pipe passes through, and a plurality of blades extending from the base plate to the cover, thus surrounding and delimiting the chamber.

7. The gas injection device according to claim 6, wherein the capillary passages are bordered by the blades respectively extending at least one of substantially tangentially to the periphery of the chamber or substantially orthogonally to the base plate.

8. The gas injection device according to claim 1, wherein the chamber has a substantially rotational symmetric shape.

9. The gas injection device according to claim 8, wherein at least a portion of the inlet pipe is arranged substantially coaxial with the chamber.

10. A tank for a liquid, the tank having arranged therein a gas injection device according to claim 1, wherein the first end of the inlet pipe is connected to a connector element of the tank, the connector element configured to be joined to a gas supply line.

11. The tank according to claim 10, wherein the tank is configured to contain a cryogenic or storable fuel as the liquid.

12. A spacecraft comprising a tank according to claim 11 and a gas supply line connected to the tank.

* * * * *